May 28, 1957  J. M. LIITTJOHANN  2,793,391
GIZZARD CUTTER
Filed Nov. 2, 1954  3 Sheets-Sheet 1

INVENTOR.
Joseph M. Liittjohann
BY
Bryant & Lowry
ATTORNEYS.

May 28, 1957  J. M. LIITTJOHANN  2,793,391
GIZZARD CUTTER

Filed Nov. 2, 1954  3 Sheets-Sheet 2

INVENTOR.
Joseph M. Liittjohann
BY Bryant & Lowry
ATTORNEYS.

May 28, 1957    J. M. LIITTJOHANN    2,793,391
GIZZARD CUTTER
Filed Nov. 2, 1954    3 Sheets-Sheet 3
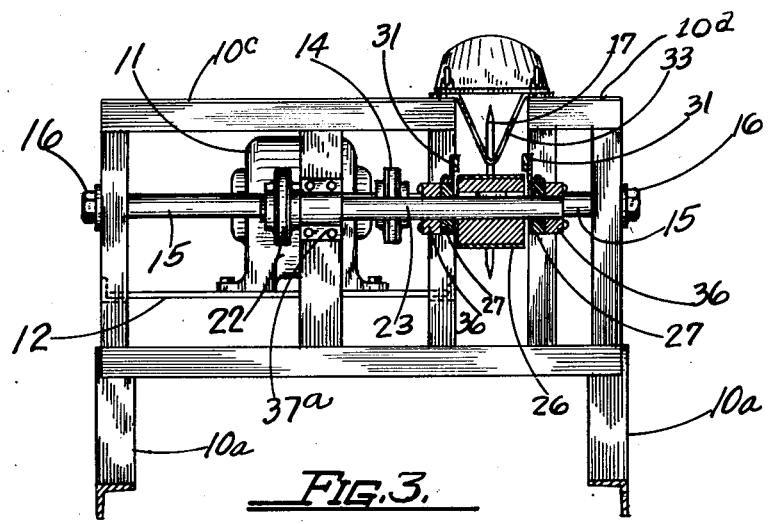
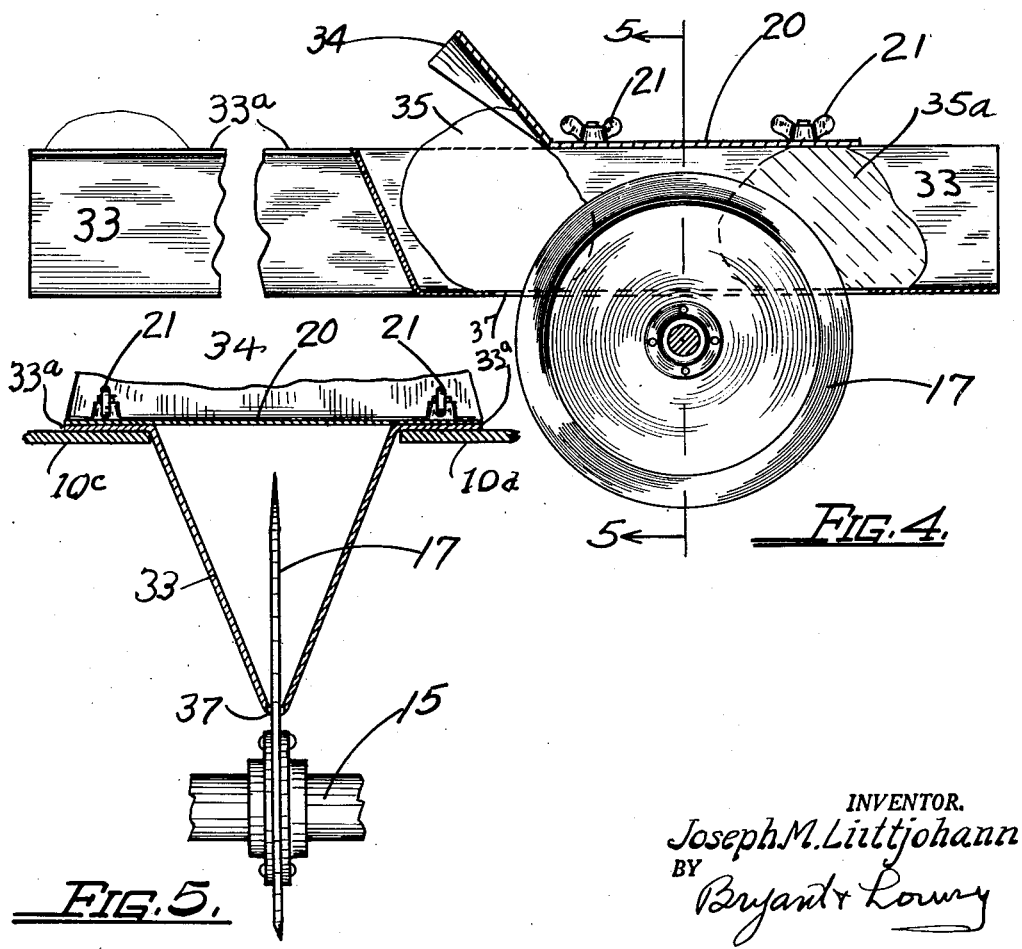
INVENTOR.
Joseph M. Liittjohann
BY
Bryant & Lowry
ATTORNEYS 2,793,391

GIZZARD CUTTER

Joseph M. Liittjohann, Wheat Ridge, Colo.

Application November 2, 1954, Serial No. 466,357

6 Claims. (Cl. 17—11)

This invention relates to certain new and useful improvements in gizzard cutters.

In dressing poultry for market, it is customary to split the gizzards, and remove the lining and contents, saving the gizzards for eating. When dressing poultry in large numbers, these operations require a great deal of time and labor, often necessitating several persons cutting by hand. Then, too, there is the ever present hazard of seriously cutting one hand with the knife operated by the other hand.

The present invention is designed to provide a novel machine for rapidly and safely performing the cutting operations and discharging the cut gizzards from the machine in readiness for lining and contents removal and for washing.

In carrying out the above end, a further object of the invention is to provide a novel guide trough to receive the gizzards and hold them in proper position while they are being split by means of a power driven cutting disk.

Another object is to provide a novel machine in which the rotary cutting disk will discharge the split gizzards from the trough onto a conveyor.

Yet another object is to provide a holddown-plate spanning the open top of the trough and serving to hold the gizzards against upward movement while they are being split by the cutting disk.

A further object is to provide for adjusting the cutting disk a greater or lesser distance into the trough, thereby adapting the machine for cutting the gizzards of different types of birds.

Another object is to provide a novel machine in which the driving motor and pulleys and belts are disposed below a top plate, thereby minimizing danger of injury to the operator.

A still further object is to provide a simple and practicable construction which may be readily cleaned and thus kept in sanitary condition.

With the above and other objects in view that will become apparent as the nature of the invention is better understood, the same consists in the novel form, combination and arrangement of parts hereinafter more fully described, shown in the accompanying drawings, and claimed.

In the drawings:

Fig. 3 is a transverse sectional view on line 3—3 of Fig. 1;

Fig. 4 is an enlarged longitudinal sectional view, partly in elevation, on line 4—4 of Fig. 2; and Fig. 5 is a transverse sectional view on line 5—5 of Fig. 4.

Figure 1:
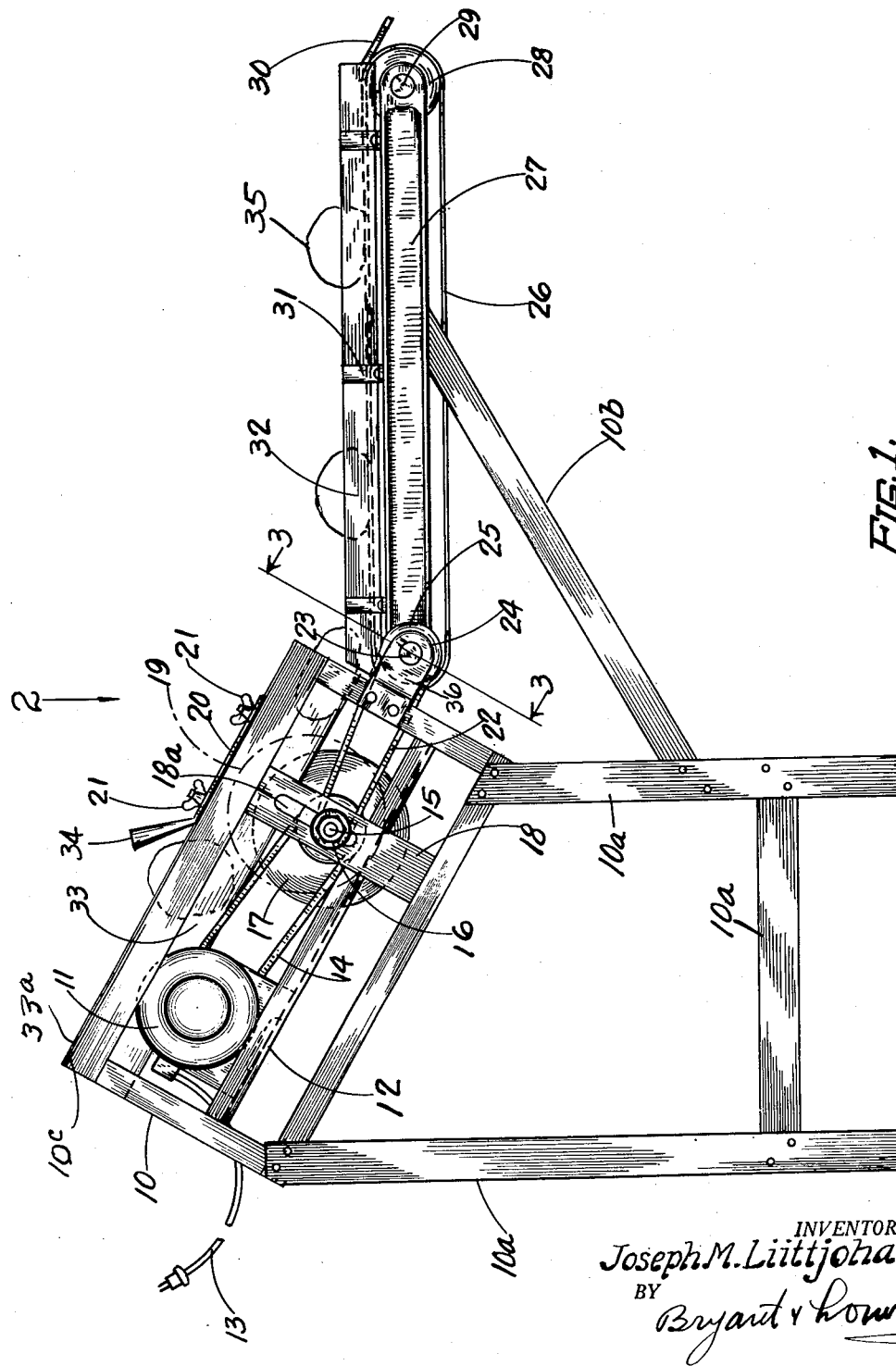
Fig. 1 is a side elevation of the machine.
Figure 2:
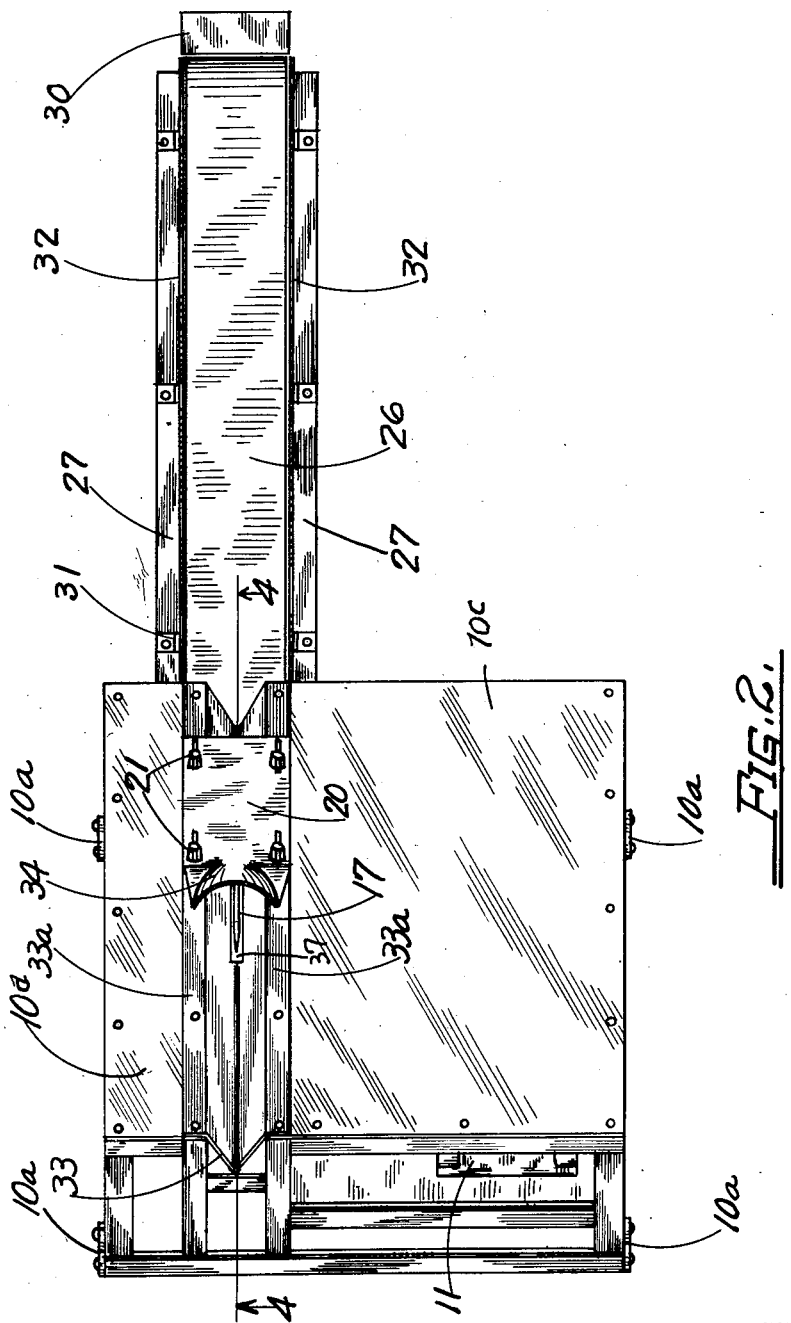
Fig. 2 is a top plan view as indicated by the arrow 2 of Fig. 1.

A preferred construction has been shown in the drawings and will be rather specifically described. It is to be understood, however, that variations may be made within the scope of the invention as claimed.

An inclined frame structure 10 is fixedly mounted on a legged supporting structure 10$^a$. An inclined top is secured upon the frame structure 10 and is composed to two inclined plates 10$^c$ and 10$^d$ having their inner edges spaced apart. The plate 10$^c$ is much wider than the plate 10$^d$ to cover the driving means hereinafter described.

An inclined trough 33 is interposed between the two plates 10$^c$ and 10$^d$ and is of V-shape in transverse section. The side walls of this trough have flanges 33$^a$ at their upper edges and these flanges are suitably secured on the plate 10$^c$ and 10$^d$. The bottom of the trough is formed with a narrow longitudinal slot 37.

A gizzard-splitting disk 17 extends upwardly into the trough 33 through the slot 37, and a gizzard holddown-plate 20 extends across the open top of said trough over said disk. This plate 20 is detachably secured at 21 upon the trough flanges 33$^a$ and the upper end of said plate has a transversely arched throat flange 34 for depressing the gizzards 35 and guiding them under said plate as the gizzards are pushed down the trough 33 by hand. As the gizzards travel under the plate 20, they are split by the disk 17. This splitting, however, does not cut the gizzards into two separate halves but is sufficient to allow them to be later opened, permitting removal of the linings and contents. The friction of the disk 17 with the gizzards 35 discharges the latter from the trough 33 onto a conveyor belt 26 in the present disclosure. This belt carries the split gizzards to a convenient table or the like on which the linings and contents are removed, and the gizzards are then washed, ready for market.

The cutting disk 17 is secured upon a transverse shaft 15, said shaft being belt-and-pulley connected at 14 with an electric motor 11. A suitable motor-mounting plate is shown at 12 being embodied in the frame structure 10 below the top plate 10$^c$. This plate 10$^c$ covers the elements 11, 14, and 15 and overcomes a hazard which would be present if said elements were exposed. The motor preferably has an ordinary plug-in service cord 13.

The shaft 15 is mounted in bearings 16 which are vertically adjustable in slots 18$^a$ in vertical members 18 of the frame 10. The cutting disk 17 may thus be vertically adjusted (see dotted line 19) for cutting large and small gizzards, thereby adapting the machine for cutting the gizzards of different kinds of birds.

A frame 27 is provided for the shafts 23 and 29 of the rollers 25 and 28 around which the conveyor belt 26 passes. Bearings for the shaft 23 are shown at 36 and 37$^a$, the latter being laterally spaced from the frame 27. Near this bearing 37$^a$ the shaft 23 is belt-and-pulley connected at 22 with the shaft 15 to drive the conveyor belt 26. Along the edges of this belt there are suitable guide walls 32 secured at 31 to the frame 27.

The frame 27 is braced at 10$^b$ to the supporting structure 10$^a$. The element 30 shown at the outer end of this frame 27 is simply a plate or chute down which the split gizzards may slide from the belt 26 onto the worktable or the like.

In operation, with the cutting disk 17 rotating and the conveyor belt 26 operating, the gizzards 35 are fed by hand into the trough 33 and started under the throat flange 34 of the holddown plate 20. As soon as the cut is started by the disk 17, the friction between the gizzard and disk feeds the former for the rest of the cut and discharges the cut gizzards onto the belt 26. It is preferable to place several gizzards in the trough 33 ahead of the disk 17 and to push on a gizzard behind the one which is next to be cut, overcoming danger of cutting the fingers. The split gizzards are carried by the conveyor belt 26 to the work-table or the like where the linings and contents are removed, after which the gizzards are washed.

From the foregoing it will be seen that a novel and advantageous machine has been disclosed for the desired purposes. However, attention is again invited to the possibility of making minor changes without departing from the spirit and scope of the invention as claimed.

I claim:

1. A gizzard splitting machine comprising a frame structure, a top secured on said frame structure and having an elongated opening, an elongated trough mounted longitudinally in said elongated opening to receive and guide the gizzards to be split, said trough being V-shaped in transverse section and having an open upper side and a longitudinal slot in its bottom, a rotatable cutting disk mounted on said frame structure and extending upwardly into said trough through said slot, means under said top for driving said disk, and a holddown plate secured to the top edges of said trough over said disk, said holddown plate being spaced from the outer periphery of said disk a distance sufficient to depress the gizzards into contact with the cutting disk, without at the same time interfering with the normal passage of the gizzards therebetween and said holddown plate also having a throat flange for guiding the gizzards under said holddown plate.

2. A structure as defined in claim 1, wherein said holddown plate has a throat flange for guiding the gizzards under said holddown plate.

3. The structure as defined in claim 1, including means for vertically adjusting said disk with respect to said trough and said holddown plate.

4. A structure as specified in claim 1; together with a conveyor frame connected with said frame structure and extending away from the delivery end of said trough, a conveyor belt mounted on said conveyor frame, and common actuating means for said conveyor belt and said disk driving means.

5. A structure as specified in claim 1; said trough being declined toward its delivery end.

6. A structure as specified in claim 1; said trough having longitudinal lateral flanges on the upper edges of its side walls, said longitudinal flanges being secured on said top, said holddown plate being secured upon said longitudinal flanges.

References Cited in the file of this patent
UNITED STATES PATENTS

| | | |
|---|---|---|
| 2,497,187 | Sammy | Feb. 14, 1950 |
| 2,549,540 | Spilky | Apr. 17, 1951 |
| 2,663,898 | Greiner | Dec. 29, 1953 |
| 2,695,418 | Patterson et al. | Nov. 30, 1954 |